United States Patent
Tullberg

(10) Patent No.: US 12,337,800 B2
(45) Date of Patent: Jun. 24, 2025

(54) ROOF RAIL SYSTEM FOR BEING ARRANGED ON THE ROOF OF A VEHICLE AND A METHOD FOR MOUNTING THE ROOF RAIL SYSTEM

(71) Applicants: Ningbo Geely Automobile Research & Development Co., Ltd., Ningbo (CN); Zhejiang Geely Holding Group Co., Ltd., Zhejiang (CN)

(72) Inventor: Oscar Tullberg, Hovås (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 58 days.

(21) Appl. No.: 18/070,206

(22) Filed: Nov. 28, 2022

(65) Prior Publication Data
US 2023/0086932 A1 Mar. 23, 2023

Related U.S. Application Data

(63) Continuation of application No. PCT/CN2021/100408, filed on Jun. 16, 2021.

(30) Foreign Application Priority Data

Jul. 10, 2020 (EP) .................................... 20185145

(51) Int. Cl.
*B60R 9/045* (2006.01)
(52) U.S. Cl.
CPC .................................... *B60R 9/045* (2013.01)
(58) Field of Classification Search
CPC ..................................................... B60R 9/045
(Continued)

(56) References Cited

U.S. PATENT DOCUMENTS 5,273,195 A * 12/1993 Cucheran ............... B60R 9/045
224/326
5,340,007 A * 8/1994 Jeuffray .................. B60R 9/045
224/325
(Continued)

FOREIGN PATENT DOCUMENTS

CN 101898536 A 12/2010
CN 202686177 U 1/2013
(Continued)

OTHER PUBLICATIONS

International Search Report from International Application No. PCT/CN2021/100408, mailed Sep. 26, 2021, 3 pages.

*Primary Examiner* — Peter N Helvey
(74) *Attorney, Agent, or Firm* — Tucker Ellis LLP

(57) ABSTRACT

A roof rail system for a vehicle includes first and second roof rails each having front and back attachment structures and a rail bar. The first rail bar is attached to its front attachment structure via a first hinge and its back attachment structure via a first lock. The second rail bar is attached to its back attachment structure via a second hinge and its front attachment structure via a second lock. A length of the first rail bar is equal to a first separating distance between the first hinge and the second lock and a length of the second rail bar is equal to a second separating distance between the second hinge and the first lock. The hinges rotate the rail bars in a horizontal plane to attach to the front attachment structures and to rotate the rail bars 90 degrees around length axes of the rail bars, respectively.

12 Claims, 4 Drawing Sheets

(58) Field of Classification Search
USPC .......................................................... 224/309
See application file for complete search history.

(56) References Cited

U.S. PATENT DOCUMENTS

| | | | | |
|---|---|---|---|---|
| 5,377,890 | A * | 1/1995 | Brunner | B60R 9/045 224/315 |
| 5,395,024 | A * | 3/1995 | Luchtenberg | B60R 9/045 224/314 |
| 5,511,709 | A * | 4/1996 | Fisch | B60R 9/045 224/326 |
| 6,050,467 | A | 4/2000 | Drouillard | |
| 6,286,739 | B1 * | 9/2001 | Stapleton | B60R 9/045 224/315 |
| 6,811,066 | B2 * | 11/2004 | Aftanas | B60R 9/045 224/325 |
| 6,959,845 | B2 * | 11/2005 | Aftanas | B60R 9/045 224/325 |
| 7,066,364 | B2 * | 6/2006 | Kmita | B60R 9/045 224/325 |
| 7,090,103 | B2 * | 8/2006 | Aftanas | E05B 71/00 224/325 |
| 7,448,523 | B2 * | 11/2008 | Aftanas | B60R 9/045 224/325 |
| 8,028,875 | B2 * | 10/2011 | Kmita | B60R 9/045 224/325 |
| 8,096,454 | B2 * | 1/2012 | Aftanas | B60R 9/045 224/321 |
| 8,251,267 | B2 * | 8/2012 | Aftanas | B60R 9/045 224/325 |
| 8,276,794 | B2 * | 10/2012 | Aftanas | B60R 9/045 224/322 |
| 8,308,035 | B2 * | 11/2012 | Polewarczyk | B60R 9/045 224/321 |
| 8,424,733 | B2 * | 4/2013 | Polewarczyk | B60R 9/045 224/321 |
| 8,485,403 | B2 * | 7/2013 | Stahl | B60R 9/045 224/325 |
| 8,528,799 | B2 * | 9/2013 | Michie | B60R 9/048 224/321 |
| 8,640,934 | B2 * | 2/2014 | Jamieson | B60R 9/058 224/325 |
| 10,279,748 | B2 * | 5/2019 | Aftanas | B60R 9/04 |
| 10,279,749 | B2 * | 5/2019 | Wang | B60R 9/058 |
| 10,576,901 | B2 * | 3/2020 | Aftanas | B60R 9/052 |
| 11,007,948 | B2 * | 5/2021 | Sala | B60R 9/045 |
| 11,027,660 | B2 * | 6/2021 | Gomes | B60R 9/045 |
| 11,718,239 | B2 * | 8/2023 | Telukunta | B60R 9/045 224/314 |
| 11,912,240 | B2 * | 2/2024 | Aftanas | B60R 9/045 |
| 2004/0134949 | A1 * | 7/2004 | Aftanas | B60R 9/045 224/321 |
| 2004/0134950 | A1 * | 7/2004 | Kmita | B60R 9/045 224/321 |
| 2005/0017037 | A1 * | 1/2005 | Aftanas | B62H 5/00 224/321 |
| 2006/0060621 | A1 * | 3/2006 | Klinkman | B60R 9/045 224/321 |
| 2008/0252100 | A1 * | 10/2008 | Salvador | B60R 9/045 296/185.1 |
| 2008/0257924 | A1 | 10/2008 | Kmita | |
| 2009/0321485 | A1 | 12/2009 | Jamieson | |
| 2010/0096422 | A1 | 4/2010 | Kim | |
| 2010/0327032 | A1 | 12/2010 | Aftanas | |
| 2011/0192870 | A1 | 8/2011 | Michie | |
| 2017/0320445 | A1 | 11/2017 | Aftanas | |

FOREIGN PATENT DOCUMENTS

| | | |
|---|---|---|
| CN | 104385993 A | 3/2015 |
| CN | 104786949 A | 7/2015 |
| CN | 107972593 A | 5/2018 |
| CN | 110466332 A | 11/2019 |
| JP | 2000355251 A | 12/2000 |
| KR | 20060042721 A | 5/2006 |

* cited by examiner

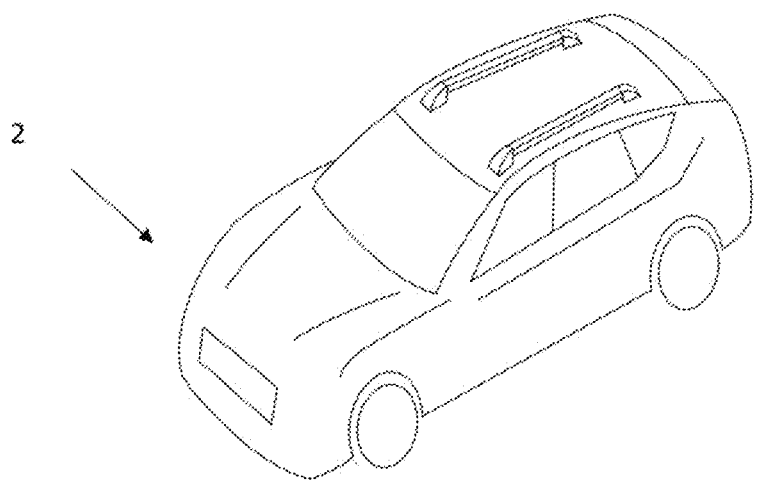
Fig. 1 - Prior art
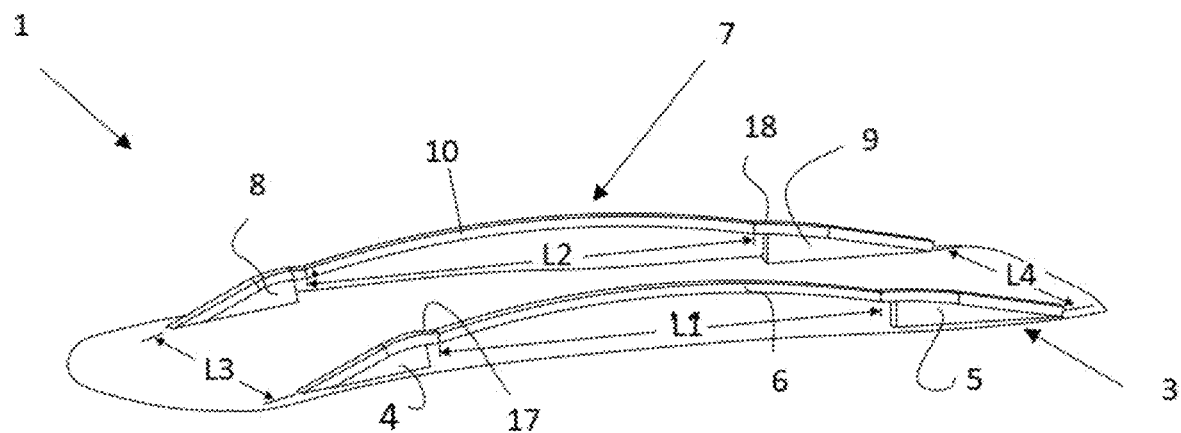
Fig. 2A
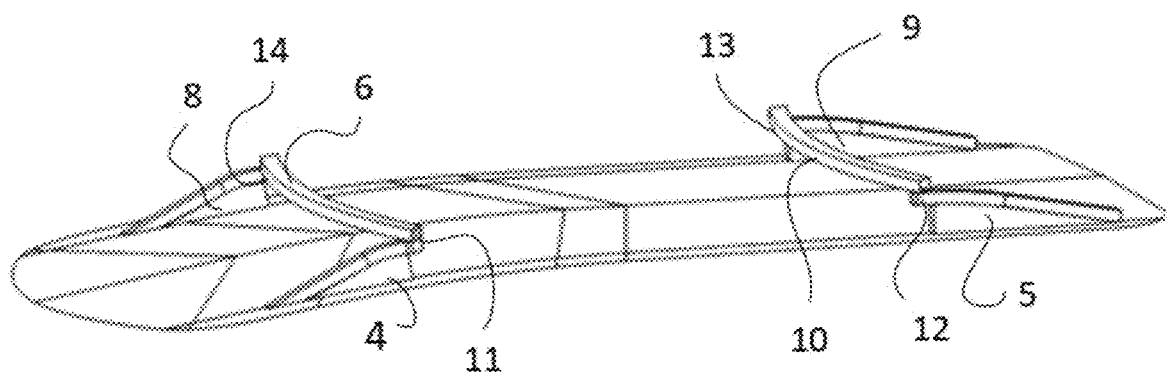
Fig. 2B

ROOF RAIL SYSTEM FOR BEING ARRANGED ON THE ROOF OF A VEHICLE AND A METHOD FOR MOUNTING THE ROOF RAIL SYSTEM

RELATED APPLICATION DATA

This application is a continuation of International Patent Application No. PCT/CN2021/100408, filed Jun. 16, 2021, which claims the benefit of European Patent Application No. 20185145.8, filed Jul. 10, 2020, the disclosures of which are incorporated herein by reference in their entireties.

TECHNICAL FIELD

The present disclosure relates to a roof rail system for being arranged on the roof of a vehicle and a method for mounting the roof rail system. More specifically, the disclosure relates to a roof rail system for being arranged on the roof of a vehicle and a method for mounting the roof rail system as defined in the introductory parts of the independent claims.

BACKGROUND

It is common to have rails arranged on the roof of vehicles running in the direction of the vehicle driving direction for both design reasons and for practical reasons. However, when using the roof for transporting luggage roof bars arranged perpendicular to the driving direction are most often preferred. Roof bars are therefore available that are easily mounted on rails. A problem is, however, that such roof bars need to be available for mounting on the vehicle roof when the need for roof transportation of goods arise. If the trip was not planed the roof bars are often left at home, e.g. in the house garage or in a storage room. There is thus a need for improved ways of enabling transportation of goods on the roof of vehicles.

SUMMARY

It is an object of the present disclosure to mitigate, alleviate or eliminate one or more of the above-identified deficiencies and disadvantages in the prior art and solve at least the above mentioned problem. According to a first aspect there is provided a roof rail system for being arranged on the roof of a vehicle, comprising a first roof rail comprising a first front attachment structure, a first back attachment structure, and a first rail bar extending from the first front attachment structure to the first back attachment structure, the first rail bar having a first length; a second roof rail comprising a second front attachment structure, a second back attachment structure, and a second rail bar extending from the second front attachment structure to the second back attachment structure, the second rail bar having a second length, wherein the first rail bar is attached to the first front attachment structure via a first hinge and wherein the first rail bar is attached to the first back attachment structure via a first lock; and wherein the second rail bar is attached to the second back attachment structure via a second hinge and wherein the second rail bar is attached to the second front attachment structure via a second lock; wherein first length of the first rail bar is equal to a first separating distance between the first hinge of the first front attachment structure and the second lock of the second front attachment structure, and the second length of the second rail bar is equal to a second separating distance between the second hinge of second back attachment structure and the first lock of the first front back structure; wherein the first hinge and the second hinge, respectively, are arranged to rotate the first rail bar and the second rail bar, respectively, in the horizontal plane to attach to the second front attachment structure and the first back attachment structure, respectively; wherein the first hinge and the second hinge, respectively, are further arranged to rotate the first rail bar and the second rail bar, respectively, 90 degrees around a first length axis of the first rail bar and around a second length axis of the second rail bar, respectively.

The problems of the prior art are thereby solved by the disclosed roof rail system. As the first rail bar and the second rail bar, respectively, can be transformed from being parts of the roof rails to being roof bars for loading cargo, the roof bars are always present on the vehicle roof and available whenever they may be needed. Further, as the first rail bar and the second rail bar, respectively, rotates in two dimensions rails with any curvature or profile in the vertical plane (in their rail mode) can be transformed into roof bars being straight in a horizontal plane when they are in a roof bar mode.

According to some embodiments, the first roof rail and the second roof rail are adapted to be arranged symmetrical on the vehicle roof with an angle A to the driving direction of the vehicle, wherein the first hinge is arranged to pivot the first rail bar around a first horizontal pivot axis angled 45–A/2 degrees to the length direction of the first roof rail, the first horizontal pivot axis being directed towards the second back attachment structure; and wherein the second hinge is arranged to pivot the second rail bar around a second horizontal pivot axis angled 45–A/2 degrees to the length direction of the second roof rail, the second horizontal pivot axis being directed towards the first front attachment structure.

An advantage with the disclosed angled hinges is that they will in one movement rotate the first rail bar and the second rail bar, respectively, in the horizontal plane to be perpendicular to the driving direction of the vehicle and at the same time rotate the bars 90 degrees around their own extension direction.

According to some embodiments, the second roof rail is adapted to arranged in parallel to the first roof rail and wherein the first length, the first separating distance, the second length, and the second separating distance are all equal.

An advantage with having parallel roof rails according to the present disclosure is that the first rail bar and the second rail bar, respectively, have the same length making manufacturing easier as the right and left roof rail, respectively, will be identical.

According to some embodiments, the first hinge is arranged to pivot the first rail bar around a first horizontal pivot axis angled 45 degrees to the length direction of the first roof rail, the first horizontal pivot axis being directed towards the second back attachment structure; and wherein the second hinge is arranged to pivot the second rail bar around a second horizontal pivot axis angled 45 degrees to the length direction of the second roof rail, the second horizontal pivot axis being directed towards the first front attachment structure.

An advantage with this embodiment is that the first rail bar and the second rail bar, respectively, will be rotated in two dimensions by the hinges so that rails with any curvature or profile in the vertical plane (in their rail mode) can be transformed into roof bars being straight in a horizontal plane when they are in a roof bar mode.

According to some embodiments, the first rail bar has a first seating area that is located at the side of the first rail bar adjacent the first front attachment structure adapted to abut the top of the first front attachment structure when the first rail bar is pivoted around the first horizontal pivot axis; and the second rail bar has a second seating area that is located at the side of the second rail bar adjacent to the second back attachment structure adapted to abut the top of the second back attachment structure when the second rail bar is pivoted around the second horizontal pivot axis. The first rail bar and the second rail bar, respectively, thus have a secure base to act as stable roof bars for heavy loads.

According to some embodiments, the first hinge and the second hinge, respectively, comprises two hinge parts wherein the first hinge part is pivotable 90 degrees in the horizontal plane and the second hinge part is pivotable 90 degrees around the length axis of the first rail bar and the second rail bar respectively. An advantage with having tow hinge parts is that an operator may choose of the first rail bar and the second rail bar, respectively, should be only rotated in the horizontal plane or if it should also be rotated around their own length axis.

According to some embodiments, the first rail bar and the second rail bar, respectively, are curved in the vertical plane. An advantage may be that the rails the follow the roof curvature of the vehicle better and thereby reduces the vehicle size.

According to some embodiments, the first rail bar and the second rail bar, respectively, are curved upwards with a higher centre part to follow a roof top that is convex.

According to some embodiments, the first rail bar and the second rail bar, respectively, are curved downwards with a lower centre part to follow a roof top that is concave.

According to some embodiments, the first rail bar and the second rail bar, respectively, have a designed profile in the vertical plane and a straight profile parallel bar shape in the horizontal plane. The profile could e.g. be handle shape, wave shaped in the vertical profile or any other profile found to have an attractive design. As long as the first rail bar and the second rail bar, respectively, are straight in a vertical plane they will work perfectly as roof bars when rotated according to the present disclosure.

According to some embodiments, the second front attachment structure comprises a third lock mechanism to lock the first rail bar when it is pivoted to attach the second front attachment structure; and the first back attachment structure comprises a fourth lock mechanism to lock the second rail bar when it is pivoted to attach the first back attachment structure. The first rail bar and the second rail bar, respectively, will thereby be fastened securely securing the load carried on top of the rail bars.

According to some embodiments, the system is arranged mirrored. As understood by a person skilled in the art, the disclosure described is naturally equally advantageous if all parts are mirrored over the length direction of the vehicle.

According to a second aspect there is provided a method for mounting the roof rail system according to the first aspect, the method comprising the steps of: mounting the first front attachment structure in a left front corner of a vehicle roof top and mounting the first back attachment structure in a left back corner with a distance between the first hinge of the first front attachment structure and the first lock of the first back attachment structure that is equal to the first length; and mounting the second front attachment structure in a right front corner of a vehicle roof top and mounting the second back attachment structure in a right back corner with a distance between the second hinge of the second front attachment structure and the second lock of the second back attachment structure that is equal to the second length; and mounting the second front attachment structure at a distance from the first front attachment structure that is equal to the first separating distance, and mounting the second back attachment structure at a distance from the first back attachment structure that is equal to the second separating distance.

The roof rail system is thereby mounted in a way that the first rail bar and the second rail bar, respectively, will rotate into place so as to be useful and locked into place as roof bars.

According to a third aspect there is provided a method for mounting the roof rail system according to the first aspect, the method comprising the steps of: mounting the first front attachment structure in a right front corner of a vehicle roof top and mounting the first back attachment structure in a right back corner with a distance between the first hinge of the first front attachment structure and the first lock of the first back attachment structure is equal to the first length; and mounting the second front attachment structure in a left front corner of a vehicle roof top and mounting the second back attachment structure in a left back corner with a distance between the second hinge of the second front attachment structure and the second lock of the second back attachment structure is equal to the second length; and mounting the second front attachment structure is mounted at a distance from the first front attachment structure that is equal to the first separating distance, and mounting the second back attachment structure at a distance from the first back attachment structure that is equal to the second separating distance.

The roof rail system is thereby mounted also mirrored in a way that the first rail bar and the second rail bar, respectively, will rotate into place so as to be useful and locked into place as roof bars.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIG. 1 shows a perspective view of a vehicle having roof rail system according to the prior art.

FIG. 2A shows a roof rail system according to the present disclosure having a curved profile.

FIG. 2B shows the roof rail system of FIG. 2A where the first rail bar and the second rail bar, respectively, are rotated in two dimensions according to the present disclosure to form roof bars.

DETAILED DESCRIPTION

Figure 2C:
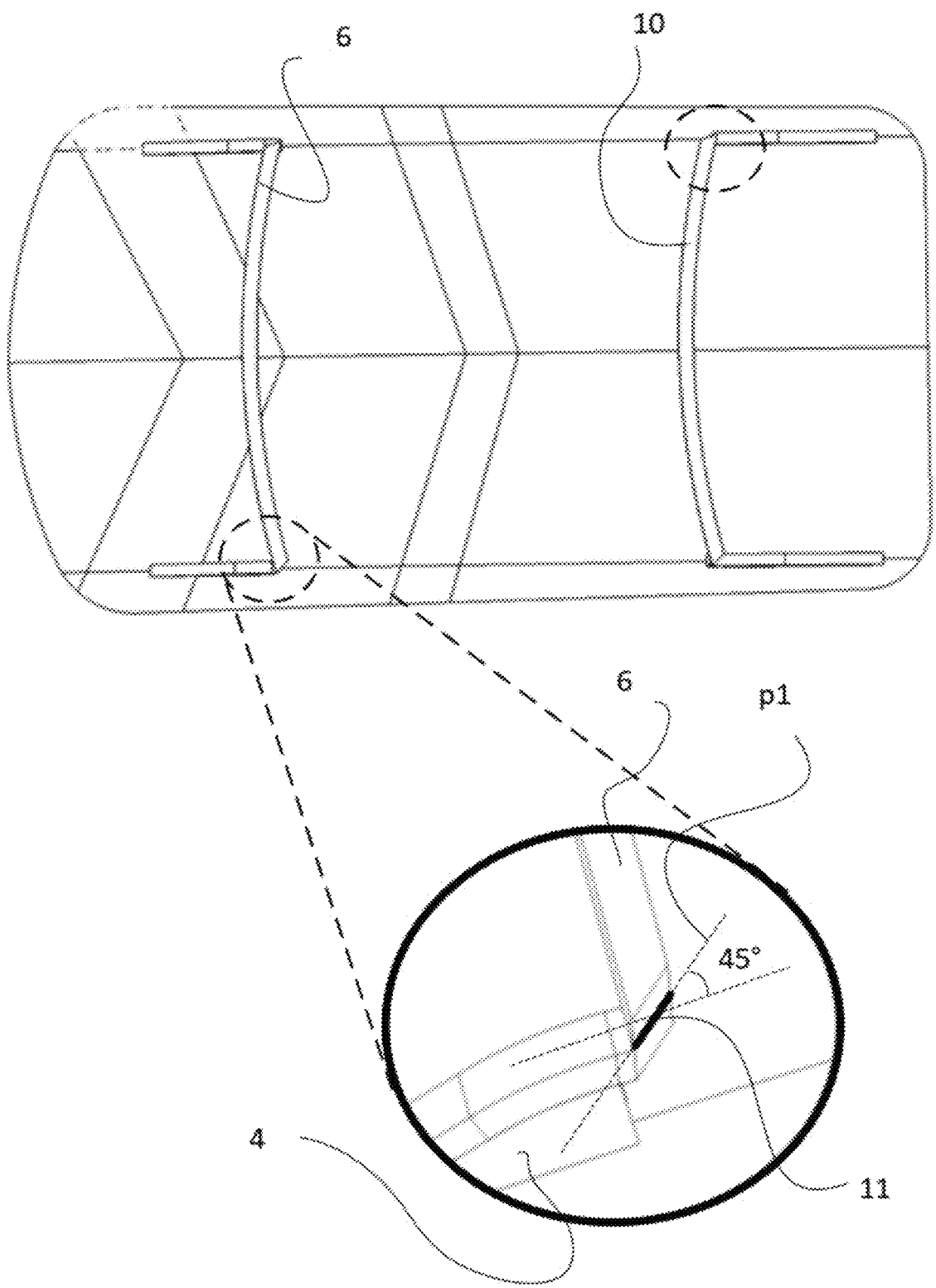
FIG. 2C is a top view of the configuration shown in FIG. 2B comprising an enlargement of the hinge rotating the first rail bar and the second rail bar, respectively.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

FIG. 1 shows a perspective view of a vehicle having roof rail according to the prior art.

FIG. 2A shows the first aspect of this disclosure shows a roof rail system the first aspect for being arranged on the roof of a vehicle 2, comprising a first roof rail 3 comprising a first front attachment structure 4, a first back attachment structure 5, and a first rail bar 6 extending from the first front attachment structure 4 to the first back attachment structure 5, the first rail bar 6 having a first length L1. The roof rail system further comprises a second roof rail 7 comprising a second front attachment structure 8, a second back attachment structure 9, and a second rail bar 10 extending from the second front attachment structure 8 to the second back attachment structure 9, the second rail bar 10 having a second length L2. The first rail bar 6 is attached to the first front attachment structure 4 via a first hinge 11 and the first rail bar 6 is attached to the first back attachment structure 5 via a first lock 1. The second rail bar 10 is attached to the second back attachment structure 9 via a second hinge 13 and the second rail bar 10 is attached to the second front attachment structure 8 via a second lock 14. The first length L1 of the first rail bar 6 is equal to a first separating distance L3 between the first hinge 11 of the first front attachment structure 4 and the second lock 14 of the second front attachment structure 8, and the second length L2 of the second rail bar 10 is equal to a second separating distance L4 between the second hinge 13 of second back attachment structure 9 and the first lock 14 of the first front back structure 5. The first hinge 11 and the second hinge 13, respectively, are arranged to rotate the first rail bar 6 and the second rail bar 10, respectively, in the horizontal plane to attach to the second front attachment structure 8 and the first back attachment structure 5, respectively; wherein the first hinge 11 and the second hinge 13, respectively, are further arranged to rotate the first rail bar 6 and the second rail bar 10, respectively, 90 degree around a first length axis 15 of the first rail bar 6 and around a second length axis 16 of the second rail bar 10, respectively.

In all of FIGS. 2A-3B the first roof rail 3 and the second roof rail 7 are arranged symmetrical on the vehicle roof with an angle A to the driving direction of the vehicle, wherein the first hinge 11 is arranged to pivot the first rail bar 6 around a first horizontal pivot axis p1 angled 45−A/2 degrees to the length direction of the first roof rail 3, the first horizontal pivot axis p1 being directed towards the second back attachment structure 9; and the second hinge 13 is arranged to pivot the second rail bar 10 around a second horizontal pivot axis p2 angled 45−A/2 degrees to the length direction of the second roof rail 7, the second horizontal pivot axis p2 being directed towards the first front attachment structure 4.

Figure 3A:
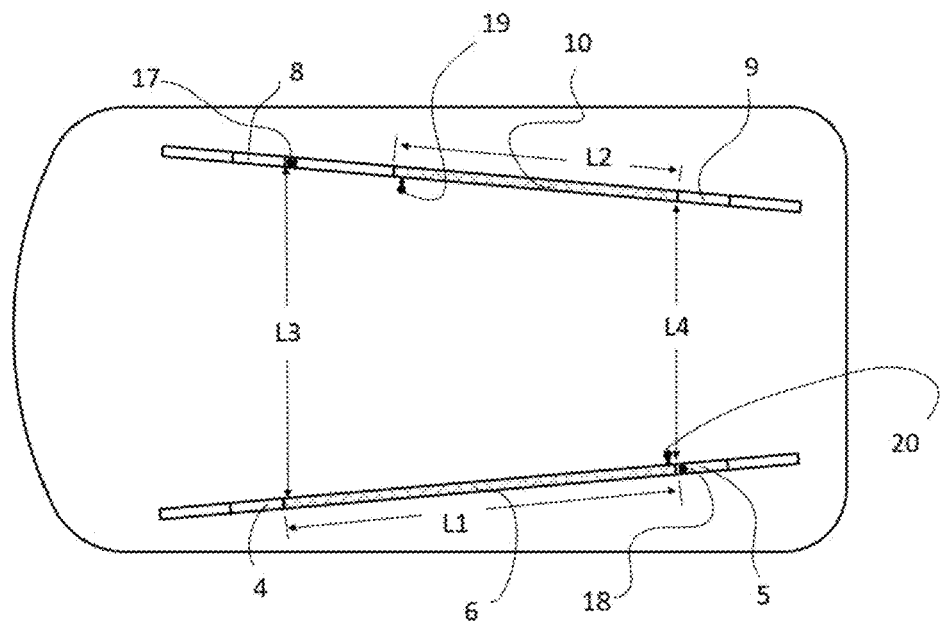
FIG. 3A is a top view of a vehicle having a roof rail system according to the present disclosure, similar to the embodiment shown in FIGS. 2A-2C but where the first rail bar and the second rail bar, respectively, are symmetrical but not parallel.
Figure 3B:
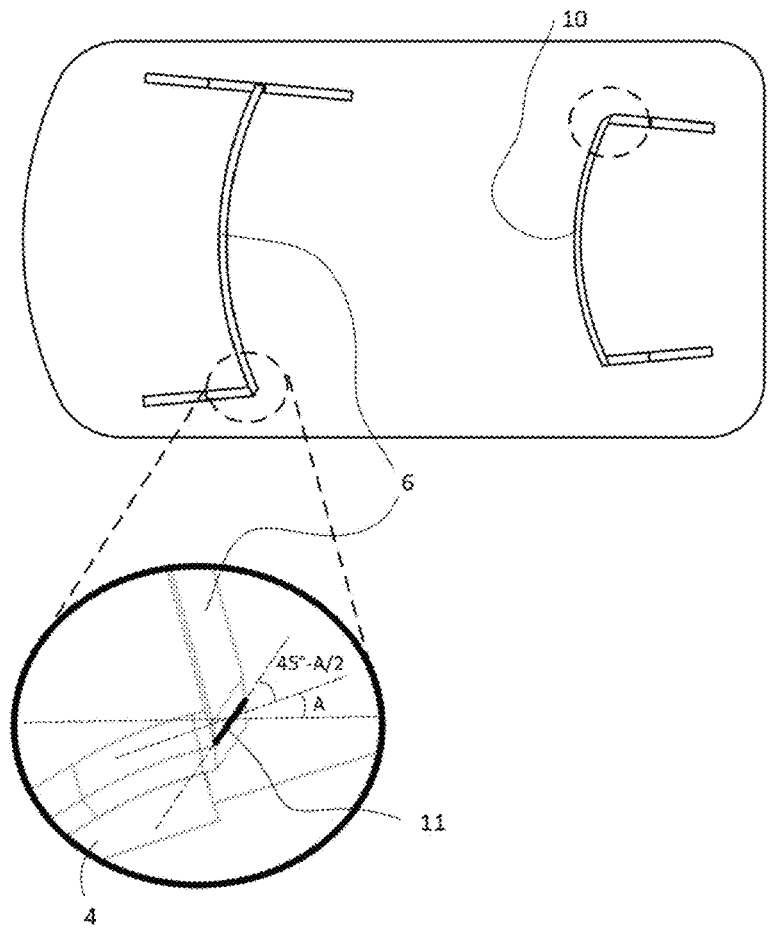
FIG. 3B shows the top view of a vehicle having a roof rail system according to the present disclosure where the first rail bar and the second rail bar, respectively, are curved and rotated in two dimensions to form roof bars. The hinge is enlarged.

In FIGS. 3A and 3B the angle A is greater than zero so that the first roof rail and the second roof rail are not arranged in parallel. Instead the second separating distance L4 between the first back attachment structure 5 and the second back attachment structure 9 of the rails is smaller than the first separating distance L3 between the first front attachment structure 4 and the second back attachment structure 5 of the rails.

In FIGS. 2A-2C the second roof rail 7 is arranged in parallel to the first roof rail 3 and the first length L1, the first separating distance L3, the second length L2, and the second separating distance L4 are all equal. The first rail bar and the second rail bar, respectively, will thereby fit perfectly when rotated as shown in FIGS. 2B, 2C and 3B. In this embodiment, where the rails are arranged parallel on the vehicle roof top, the angle A is zero and the hinge is thus arranged angled in 45 degrees to the driving direction of the vehicle and the length direction of the first roof rail 3 and second roof rail 7.

With reference to FIG. 2C the first hinge 11 is arranged to pivot the first rail bar 6 around a first horizontal pivot axis p1 angled 45 degrees to the length direction of the first roof rail 3, the first horizontal pivot axis p1 being directed towards the second back attachment structure 9. The second hinge 13 is arranged to pivot the second rail bar 10 around a second horizontal pivot axis p2 (not shown but equivalent to p1) angled 45 degrees to the length direction of the second roof rail 7, the second horizontal pivot axis p2 being directed towards the first front attachment structure 4.

As shown e.g. in FIG. 2A, the first rail 3 has a first seating area 17 that is located at the side of the first rail bar 6 adjacent the first front attachment structure 4 adapted to abut the top of the first front attachment structure 4 when the first rail bar 6 is pivoted around the first horizontal pivot axis p1; and the second rail 7 has a second seating area 18 that is located at the side of the second rail bar 10 adjacent to the second back attachment structure 9 adapted to abut the top of the second back attachment structure 9 when the second rail bar 10 is pivoted around the second horizontal pivot axis p2. The first hinge 11 and the second hinge 13 (not shown but equivalent to 11), respectively, are angled so as to direct the first rail bar and the second rail bar, respectively, in a direction perpendicular to the driving direction of the vehicle and to attach to the third lock 12, and fourth lock 14.

The first rail bar 6 and the second rail bar 10, respectively, are curved in the vertical plane as shown in FIGS. 2A-2C and FIG. 3B. The first rail bar 6 and the second rail bar 10, respectively, may be curved upwards with a higher centre part as in FIGS. 2A-3B. However, the first rail bar 6 and the second rail bar 10, respectively, may be curved downwards with a lower center part (not shown) to follow the roof of a different car roof.

With reference to FIG. 3A the second front attachment structure 8 comprises a third lock mechanism 17 to lock the first rail bar 6 when it is pivoted to attach the second front attachment structure 8; and the first back attachment structure 5 comprises a fourth lock mechanism 18 to lock the second rail bar 10 when it is pivoted to attach the first back attachment structure 5. Protrusions 19 and 20 of the second rail (10) and the first rail bar (3), respectively, are male parts of the lock mechanisms 17 and 18 directed in a horizontal direction, as seen in FIG. 2A, when the first rail bar and the second rail bar, respectively, are in a rail mode. The same protrusions 19 and 20 are instead parts of the locking mechanisms 17 and 18 when the first rail bar and the second rail bar, respectively, are in a roof bar mode.

Figure 4:
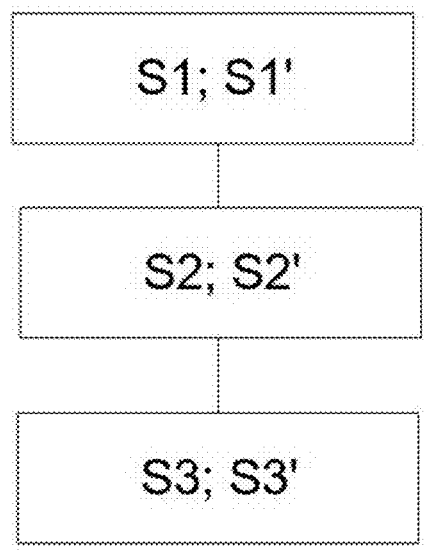
FIG. 4 is a flow chart showing the method of mounting the roof rail system of the present disclosure.

With reference to FIG. 4 the second aspect of this disclosure shows a method for mounting the roof rail system according to the first aspect, the method comprising the steps of: mounting S1 the first front attachment structure 4 in a left front corner of a vehicle roof top and mounting the first back attachment structure 5 in a left back corner with a distance between the first hinge 11 of the first front attachment structure 4 and the first lock 12 of the first back attachment structure 5 that is equal to the first length L1; and mounting S2 the second front attachment structure 8 in a right front corner of a vehicle roof top and mounting the second back attachment structure 9 in a right back corner with a distance between the second hinge 13 of the second front attachment structure 8 and the second lock 14 of the second back attachment structure 9 that is equal to the second length L2; and mounting S3 the second front attachment structure 8 at a distance from the first front attachment structure 4 that is equal to the first separating distance L3, and mounting the second back attachment structure 9 at a distance from the first back attachment structure 5 that is equal to the second separating distance L4.

With reference to FIG. 4 the third aspect of this disclosure shows a method for mounting the roof rail system according to the first aspect but mirrored, the method comprising the steps of: mounting S1' the first front attachment structure 4 in a right front corner of a vehicle roof top and mounting the first back attachment structure 5 in a right back corner with a distance between the first hinge 11 of the first front attachment structure 4 and the first lock 12 of the first back attachment structure 5 is equal to the first length L1; and mounting S2' the second front attachment structure 8 in a left front corner of a vehicle roof top and mounting the second back attachment structure 9 in a left back corner with a distance between the second hinge 13 of the second front attachment structure 8 and the second lock 14 of the second back attachment structure 9 is equal to the second length L2; and mounting S3' the second front attachment structure 8 is mounted at a distance from the first front attachment structure 4 that is equal to the first separating distance L3, and mounting the second back attachment structure 9 at a distance from the first back attachment structure 5 that is equal to the second separating distance L4.

The person skilled in the art realizes that the present disclosure is not limited to the preferred embodiments described above. The person skilled in the art further realizes that modifications and variations are possible within the scope of the appended claims. For example, the second separating distance L4 could be greater than the first separating distance L3, which would cause the angle A to be negative. A person skilled in the art further realizes that the locking mechanisms for locking the rail bars in either rail mode or bar mode can be made in a number of other ways than the example shown in this disclosure. Additionally, variations to the disclosed embodiments can be understood and effected by the skilled person in practicing the claims, and from a study of the drawings, the disclosure, and the appended claims.

What is claimed is:

1. A roof rail system for being arranged on the roof of a vehicle, comprising
    a first roof rail comprising a first front attachment structure, a first back attachment structure, and a first rail bar extending from the first front attachment structure to the first back attachment structure, the first rail bar having a first length;
    a second roof rail comprising a second front attachment structure, a second back attachment structure, and a second rail bar extending from the second front attachment structure to the second back attachment structure, the second rail bar having a second length,
    wherein the first rail bar is attached to the first front attachment structure via a first hinge and wherein the first rail bar is attached to the first back attachment structure via a first lock; and
    wherein the second rail bar is attached to the second back attachment structure via a second hinge and wherein the second rail bar is attached to the second front attachment structure via a second lock;
    wherein first length of the first rail bar is equal to a first separating distance between the first hinge of the first front attachment structure and the second lock of the second front attachment structure, and the second length of the second rail bar is equal to a second separating distance between the second hinge of second back attachment structure and the first lock of the first front back structure;
    wherein the first hinge and the second hinge, respectively, are arranged to rotate the first rail bar and the second rail bar, respectively, in the horizontal plane to attach to the second front attachment structure and the first back attachment structure, respectively;
    wherein the first hinge and the second hinge, respectively, are further arranged to rotate the first rail bar and the second rail bar, respectively, 90 degrees around a first length axis of the first rail bar and around a second length axis of the second rail bar, respectively.

2. The roof rail system according to claim 1, wherein the first roof rail and the second roof rail are adapted to be arranged symmetrical on the vehicle roof with an angle A to the driving direction of the vehicle,
    wherein the first hinge is arranged to pivot the first rail bar around a first horizontal pivot axis angled 45-A/2 degrees to the length direction of the first roof rail, the first horizontal pivot axis being directed towards the second back attachment structure; and
    wherein the second hinge is arranged to pivot the second rail bar around a second horizontal pivot axis angled 45-A/2 degrees to the length direction of the second roof rail, the second horizontal pivot axis being directed towards the first front attachment structure.

3. The roof rail system according to claim 1, wherein the second roof rail is adapted to arranged in parallel to the first roof rail and wherein the first length, the first separating distance, the second length, and the second separating distance are all equal.

4. The roof rail system according to claim 3, wherein the first hinge is arranged to pivot the first rail bar around a first horizontal pivot axis angled 45 degrees to the length direction of the first roof rail, the first horizontal pivot axis being directed towards the second back attachment structure; and wherein the second hinge is arranged to pivot the second rail bar around a second horizontal pivot axis angled 45 degrees to the length direction of the second roof rail, the second horizontal pivot axis being directed towards the first front attachment structure.

5. The roof rail system according to claim 2, wherein the first rail has a first seating area that is located at the side of the first rail bar adjacent the first front attachment structure adapted to abut the top of the first front attachment structure when the first rail bar is pivoted around the first horizontal pivot axis; and wherein the second rail has a second seating area that is located at the side of the second rail bar adjacent to the second back attachment structure adapted to abut the top of the second back attachment structure when the second rail bar is pivoted around the second horizontal pivot axis.

6. The roof rail system according to claim 1, wherein the first hinge and the second hinge, respectively, comprises two hinge parts wherein the first hinge part is pivotable 90 degrees in the horizontal plane and the second hinge part is pivotable 90 degrees around the length axis of the first rail bar and the second rail bar respectively.

7. The roof rail system according to claim 1, wherein the first rail bar and the second rail bar, respectively, are curved in the vertical plane.

8. The roof rail system according to claim 7, wherein the first rail bar and the second rail bar, respectively, are curved upwards with a higher centre part.

9. The roof rail system according to claim 7, wherein the first rail bar and the second rail bar, respectively, are curved downwards with a lower centre part.

10. The roof rail system according to claim 7, wherein the first rail bar and the second rail bar, respectively, have a designed profile in the vertical plane and a straight profile parallel bar shape in the horizontal plane.

11. The roof rail system according to claim 1, wherein the second front attachment structure comprises a third lock mechanism to lock the first rail bar when it is pivoted to attach the second front attachment structure; and wherein the first back attachment structure comprises a fourth lock mechanism to lock the second rail bar when it is pivoted to attach the first back attachment structure.

12. The roof rail system according to claim 1, wherein the system is arranged mirrored.

* * * * *